US012228958B2

(12) United States Patent
Kundu et al.

(10) Patent No.: US 12,228,958 B2
(45) Date of Patent: Feb. 18, 2025

(54) VOLTAGE REFERENCE TEMPERATURE COMPENSATION CIRCUITS AND METHODS

(71) Applicant: Taiwan Semiconductor Manufacturing Company, Ltd., Hsinchu (TW)

(72) Inventors: Amit Kundu, Hsinchu (TW); Jaw-Juinn Horng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 46 days.

(21) Appl. No.: 18/359,931

(22) Filed: Jul. 27, 2023

(65) Prior Publication Data

US 2023/0367352 A1 Nov. 16, 2023

Related U.S. Application Data

(63) Continuation of application No. 17/873,281, filed on Jul. 26, 2022, now Pat. No. 11,755,051, which is a continuation of application No. 17/363,142, filed on Jun. 30, 2021, now Pat. No. 11,474,552.

(60) Provisional application No. 63/156,402, filed on Mar. 4, 2021.

(51) Int. Cl.

*G05F 3/26* (2006.01)
*G05F 1/46* (2006.01)
*G05F 1/567* (2006.01)

(52) U.S. Cl.

CPC .............. *G05F 3/262* (2013.01); *G05F 1/468* (2013.01); *G05F 1/567* (2013.01)

(58) Field of Classification Search

None

See application file for complete search history.

(56) References Cited

U.S. PATENT DOCUMENTS

| | | | |
|---|---|---|---|
| 5,034,626 | A | 7/1991 | Pirez et al. |
| 5,059,890 | A | 10/1991 | Yoshikawa et al. |
| 5,818,294 | A | 10/1998 | Ashmore, Jr. |
| 6,930,538 | B2 | 8/2005 | Chatal |
| 7,259,543 | B2 | 8/2007 | Chih |
| 9,383,760 | B2 | 7/2016 | Porras et al. |
| 10,466,731 | B2 | 11/2019 | Lin et al. |
| 10,585,446 | B2 | 3/2020 | Rebollo Pimentel et al. |

*Primary Examiner* — Jeffrey S Zweizig

(74) *Attorney, Agent, or Firm* — Jones Day

(57) ABSTRACT

Systems and methods are provided for generating a temperature compensated reference voltage. A temperature compensation circuit may include a proportional-to-absolute temperature (PTAT) circuit, and a complementary-to-absolute temperature (CTAT) circuit, with the PTAT circuit and the CTAT circuit including at least one common metal-oxide-semiconductor field-effect transistor (MOSFET) and being configured to collectively generate a reference voltage in response to a regulated current input. The PTAT circuit may be configured to produce an increase in magnitude of the reference voltage with an increase of temperature, and the CTAT circuit may be configured to generated a decrease in magnitude of the reference voltage with the increase of temperature, wherein the increase in magnitude of the reference voltage produced by the PTAT circuit is at least partially offset by the decrease in magnitude of the reference voltage produced by the CTAT circuit.

20 Claims, 8 Drawing Sheets

VOLTAGE REFERENCE TEMPERATURE COMPENSATION CIRCUITS AND METHODS

CROSS-REFERENCE TO RELATED APPLICATION

The application is a continuation of U.S. patent application Ser. No. 17/873,281, titled "Voltage Reference Temperature Compensation Circuits and Methods," filed on Jul. 26, 2022, which is a continuation of U.S. patent application Ser. No. 17/363,142, titled "Voltage Reference Temperature Compensation Circuits and Methods," filed on Jun. 30, 2021, now U.S. Pat. No. 11,474,552, issued on Oct. 18, 2022, which claims priority to U.S. Provisional Application No. 63/156,402, titled "High Accuracy Low Temperature Coefficient MOS Voltage Reference Circuit," filed on Mar. 4, 2021, each of which is incorporated herein by reference in their entirety.

TECHNICAL FIELD

The technology described in this patent document relates generally to voltage reference circuits and methods.

BACKGROUND

Voltage references are circuits that are commonly used as functional blocks in mixed-mode and analog integrated circuits (ICs) such as data converters, phase lock-loops (PLLs), oscillators, power management circuits, dynamic random access memory (DRAM), flash memory, and much more. A voltage reference is preferred to be nominally independent of temperature, power supply, and load variations.

To help compensate for variations in temperature, known voltage reference circuits include temperature compensation circuits that utilize bipolar junction transistor (BJT) technology. In evolving technologies, such as low voltage reference circuits, the performance of BJT-based temperature compensation circuits may be constrained, for example due to BJT or diode cut-in voltages. There is therefore a need for a voltage reference circuit that provides a high accuracy, low temperature coefficient (TC) regulated voltage using metal-oxide semiconductor (MOS) based technology.

BRIEF DESCRIPTION OF THE DRAWINGS

Aspects of the present disclosure are best understood from the following detailed description when read with the accompanying figures.

DETAILED DESCRIPTION

Figure 1:
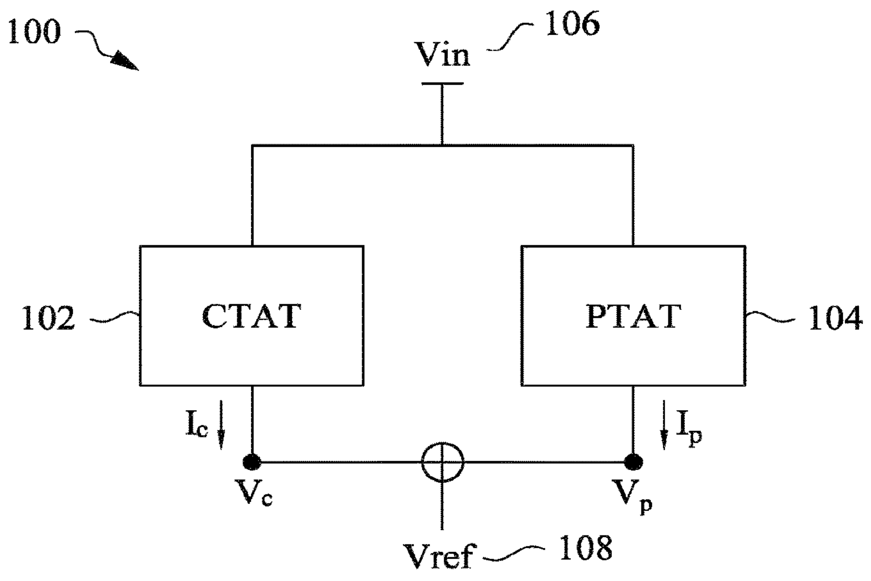
FIG. 1 is a block diagram of an exemplary voltage reference circuit.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments in accordance with this disclosure relate generally to IC (integrated circuit) devices, and more specifically, provide circuits and methods of producing circuits for process-invariant and temperature-independent voltage reference circuits in low-voltage applications. High temperature generally changes the characteristics of IC devices in ways that adversely impact their operating speed and reliability, therefore low-cost and temperature-independent devices are desired, particularly for modern portable and IoT (Internet-of-things) devices. IoT devices are usually untethered and require components with low power consumption. Sensing devices for IoT applications such as pressure, temperature, or humidity sensors, use ADC (analog-to-digital converter) and DAC (digital-to-analog converter) components that are temperature-independent and operate under low bias voltage. Voltage reference circuits in accordance with this disclosure are integral and vital parts for the above-mentioned low-power IoT applications, or power supply systems, such as low dropout (LDO) regulators.

FIG. 1 is a block diagram of an exemplary voltage reference circuit 100. Voltage reference circuits in accordance with this disclosure produce substantially temperature-independent voltage outputs by offsetting temperature-change-induced output variations. A voltage reference circuit 100 may comprise a complementary-to-absolute-temperature (CTAT) circuit 102 and a proportional-to-absolute temperature (PTAT) circuit 104 that receive a voltage input (Vin) 106 and produce a substantially temperature-independent voltage output (Vref) 108.

Voltage reference circuit 100 is a substantially temperature-independent voltage reference circuit, in which a positive temperature dependency of the PTAT circuit 104 is cancelled by a negative temperature dependency of the CTAT circuit 102, thus resulting in a stable output voltage (Vref) 108 at a reference temperature. In the PTAT circuit 104, the variation in output voltage is proportional to temperature, i.e., increasing and decreasing as temperature increases and decreases, respectively. In the CTAT circuit 102, the variation in output voltage is complementary to temperature. i.e., decreasing and increasing as temperature increases and decreases, respectively. In operation, the PTAT circuit 104 generates output voltage $V_P$ and current $I_P$, and the CTAT circuit 102 generates output voltage $V_C$ and current $I_C$. Output currents generated by CTAT 102 and PTAT 104 circuits are combined to generate the reference voltage (Vref) 108. Reference voltage (Vref) 108 is substantially insensitive to changes in temperature or power supply.

Figure 2:
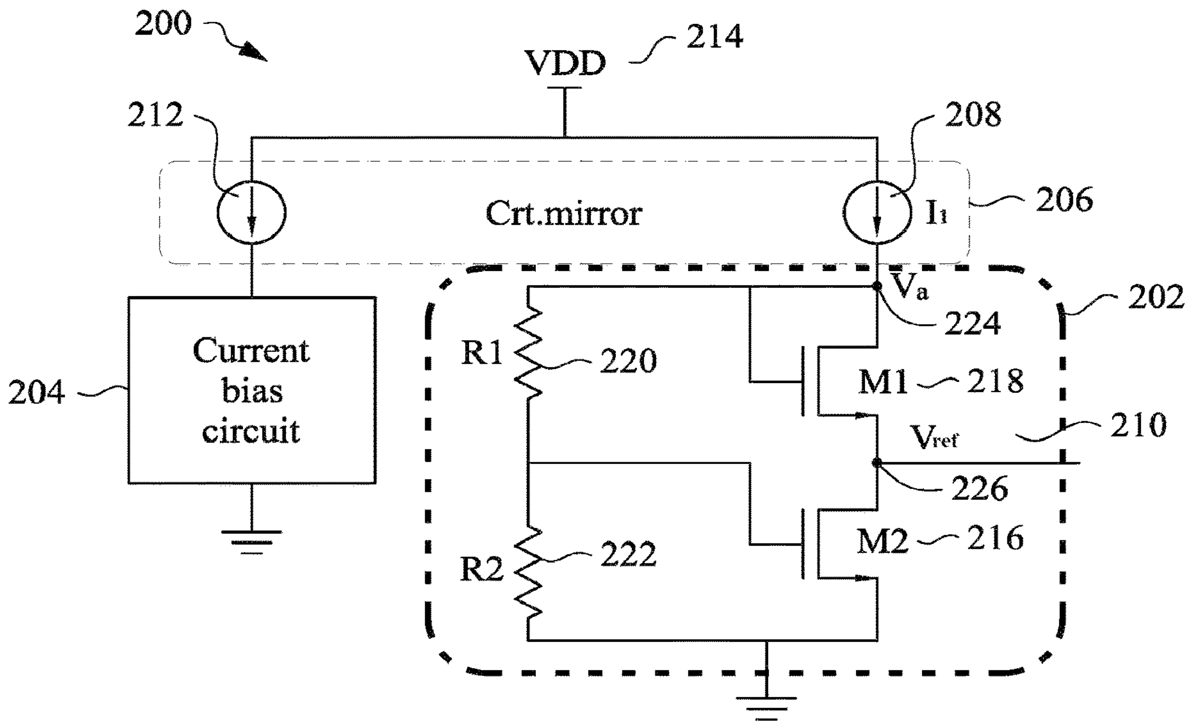
FIG. 2 is a diagram of an example voltage reference circuit that includes a combined PTAT/CTAT temperature regulation circuit.

FIG. 2 is a diagram of an example voltage reference circuit 200 that includes a combined PTAT/CTAT temperature regulation circuit 202. The voltage reference circuit 200 includes a current bias circuit 204 and a current mirror 206 that produce a regulated current input ($I_1$) 208, and the temperature regulation circuit 202 that produces a substantially temperature-independent reference voltage (Vref) 210 in response to the regulated current input ($I_1$) 208.

Figure 8:
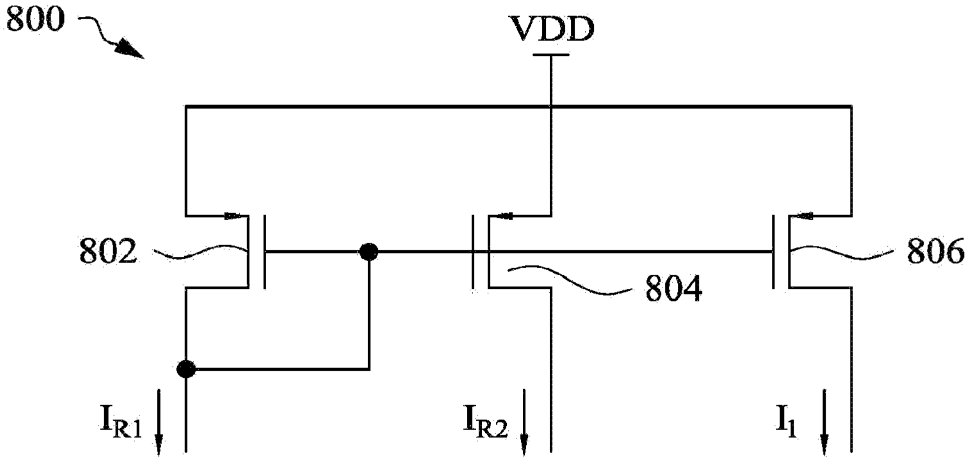
FIGS. 8 and 9 respectively illustrate examples of a current mirror circuit and a current bias circuit.
Figure 10:
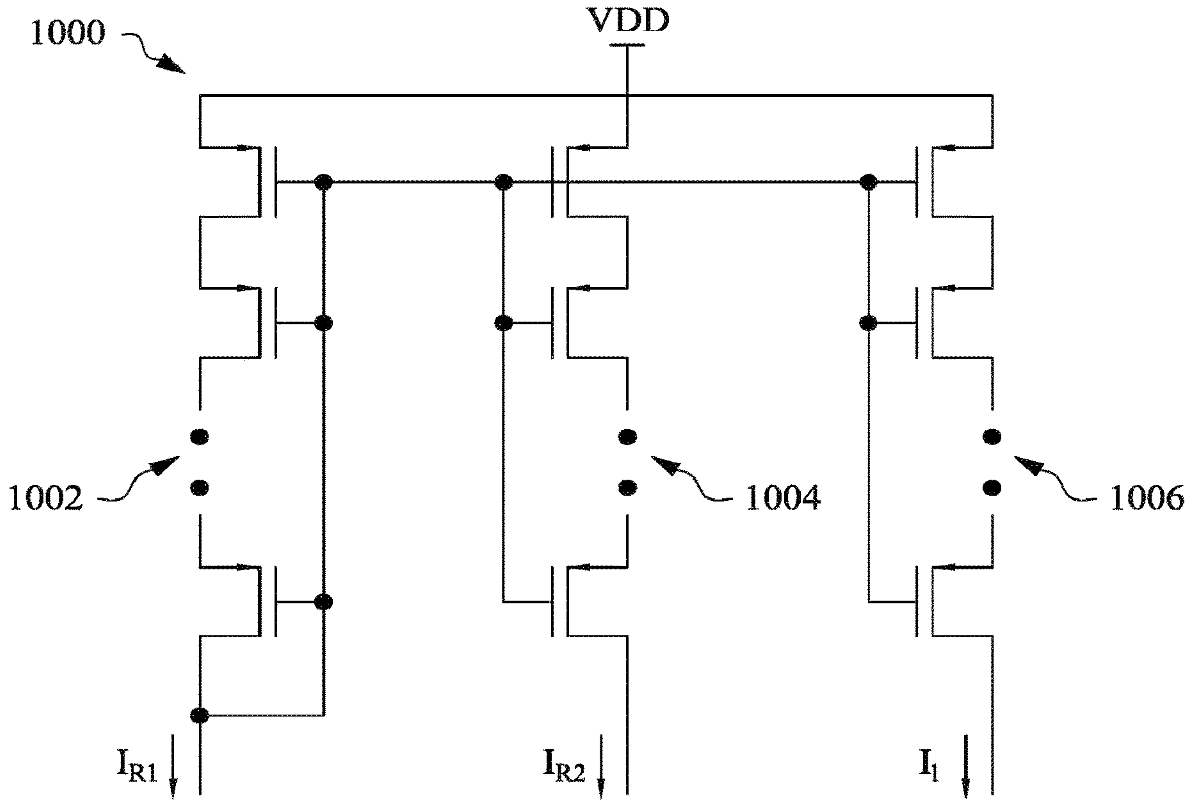
FIG. 10 illustrates an example of a stacked gate current mirror circuit.
Figure 11:
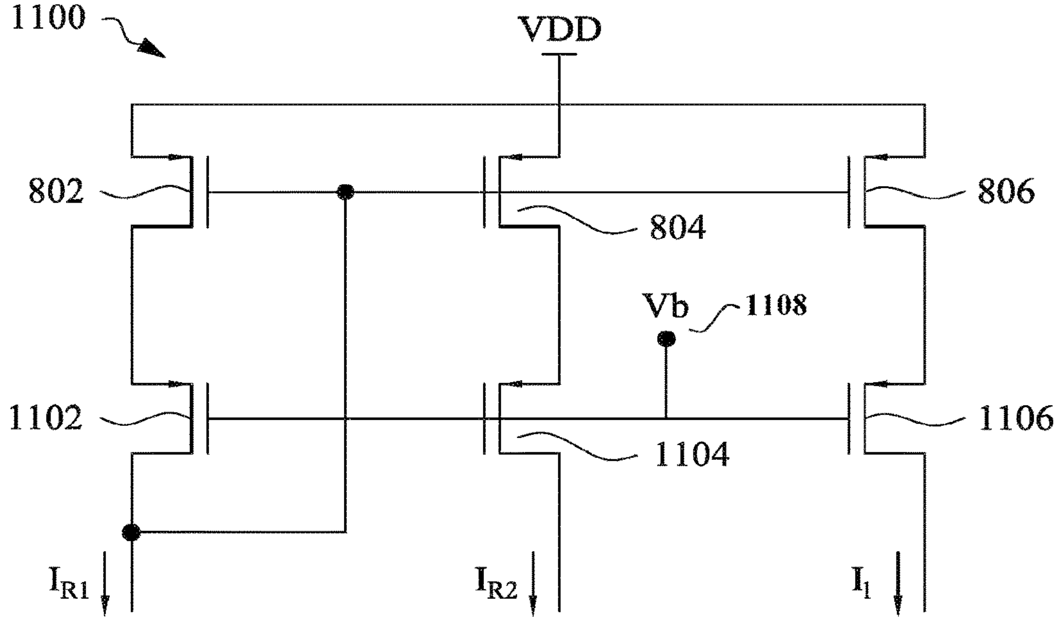
FIG. 11 illustrates an example of a wide swing cascade current mirror circuit.

The current bias circuit 204 is configured to generate a constant bias current 212 in response to a supply voltage (VDD) 214 input. An example of a current bias circuit 204 is described below with reference to FIG. 9. The current mirror circuit 206 is configured to mirror the constant bias current 212 as the regulated current ($I_1$) 208, regardless of loading. Examples of a current mirror circuit 206 are illustrated in FIGS. 8, 10 and 11, described below.

The temperature compensation circuit 202 includes a proportional-to-absolute temperature (PTAT) circuit and a complementary-to-absolute temperature (CTAT) circuit that share a common metal-oxide-semiconductor field-effect transistor (MOSFET) (M2) 216. The PTAT and CTAT circuits collectively generate the substantially temperature-independent reference voltage (Vref) 210 in response to the regulated current input ($I_1$) 208. The PTAT circuit includes a first MOSFET (M1) 218 and the common MOSFET (M2) 216, and produces an increase in magnitude of the reference voltage (Vref) 210 with an increase of temperature. The CTAT circuit includes a first resistor (R1) 220, a second resistor (R2) 222, and the common MOSFET (M2) 216, and produces a decrease in magnitude of the reference voltage (Vref) 210 with the increase of temperature. Thus, an increase in magnitude of the reference voltage (Vref) 210 produced by the PTAT circuit is at least partially offset by a decrease in magnitude of the reference voltage (Vref) produced by the CTAT circuit, and vice versa.

In the PTAT circuit, a source terminal of the first MOSFET (M1) 218 and a gate terminal of the first MOSFET (M1) 218 are coupled to an input node (Va) 224 of the temperature compensation circuit 202, a drain terminal of the first MOSFET (M1) 218 is coupled to a source terminal of the common MOSFET (M2) 216 at the output node (Vref) 226 of the temperature compensation circuit 202, and a drain terminal of the common MOSFET (M2) 216 is coupled to a ground potential. In the CTAT circuit, the first resistor (R1) 220 is coupled between the gate terminal of the first MOSFET (M1) 218 and a gate terminal of the common MOSFET (M2) 216, and the second resistor (R2) 222 is coupled between the gate terminal of the common MOSFET (M2) 216 and the ground potential.

The sizes of the MOSFETs (M1 and M2) 218, 216 and the values of the resistors (R1 and R2) 220, 222 may be selected in order to tune the temperature coefficient (TC) of the temperature compensation circuit 202 such that the reference voltage output (Vref) 210 is accurate and substantially temperature-independent (i.e., achieving a low TC) even for low VDD operations. For example, in an embodiment, MOSFETs M1 and M2 (218, 216) may be sized in a ratio of N:1, and values for M1, M2, R1, and R2 may be selected based on the following equations:

$$V_a = V_{ref} + Vgs_{M1},$$

where Va is the voltage at node 224, Vref is the reference voltage at node 226, and $Vgs_{M1}$ is the gate-source voltage of M1 218. Using voltage divider rules:

$$V_{ref} = (Vgs_{M2} - Vgs_{M1}) + (R1/R2) * Vgs_{M2},$$

where $Vgs_{M2}$ is the gate-source voltage of M2 216. M1 and M2 (218, 216) are biased in a subthreshold condition. In subthreshold condition, MOS Vgs is as follows:

$$Vgs \sim Vth + \eta * (VT) * (Id/(W/L \cdot \mu \cdot VT^2)),$$

$$VT = k \cdot T/q,$$

where k is the Bolzmann constant, T is absolute temperature, q is the charge in eV, Vth is the MOSFET threshold voltage, η=subthreshold swing, Id=current W/L=width/length of MOS μ=mobility. Thus, $$(Vgs2 - Vgs1) \sim (Vth2 - Vth1) + \eta * (VT) * \ln[(Id/W/L \cdot \mu \cdot VT^2)/Id/N * W/L \cdot \mu \cdot VT^2],$$

$$(Vgs2 - Vgs1) \sim \eta * (VT) * \ln(N),$$

where Vth/μ is the same for both transistors (M1 and M2); Id is the same in this topology, only W/L of M1~N*W·L of M2. The operation of the PTAT and CTAT circuits may therefore be expressed as follows:

$$Vref \sim \{\eta * (kT/q) * \ln(N)\} + \{(R1/R2) * Vgs_{M2}\},$$

where {η*(kT/q)*ln(N)} represents operation of the PTAT circuit, and $\{(R1/R2) * Vgs_{M2}\}$ represents the operation of the CTAT circuit.

Figure 3:
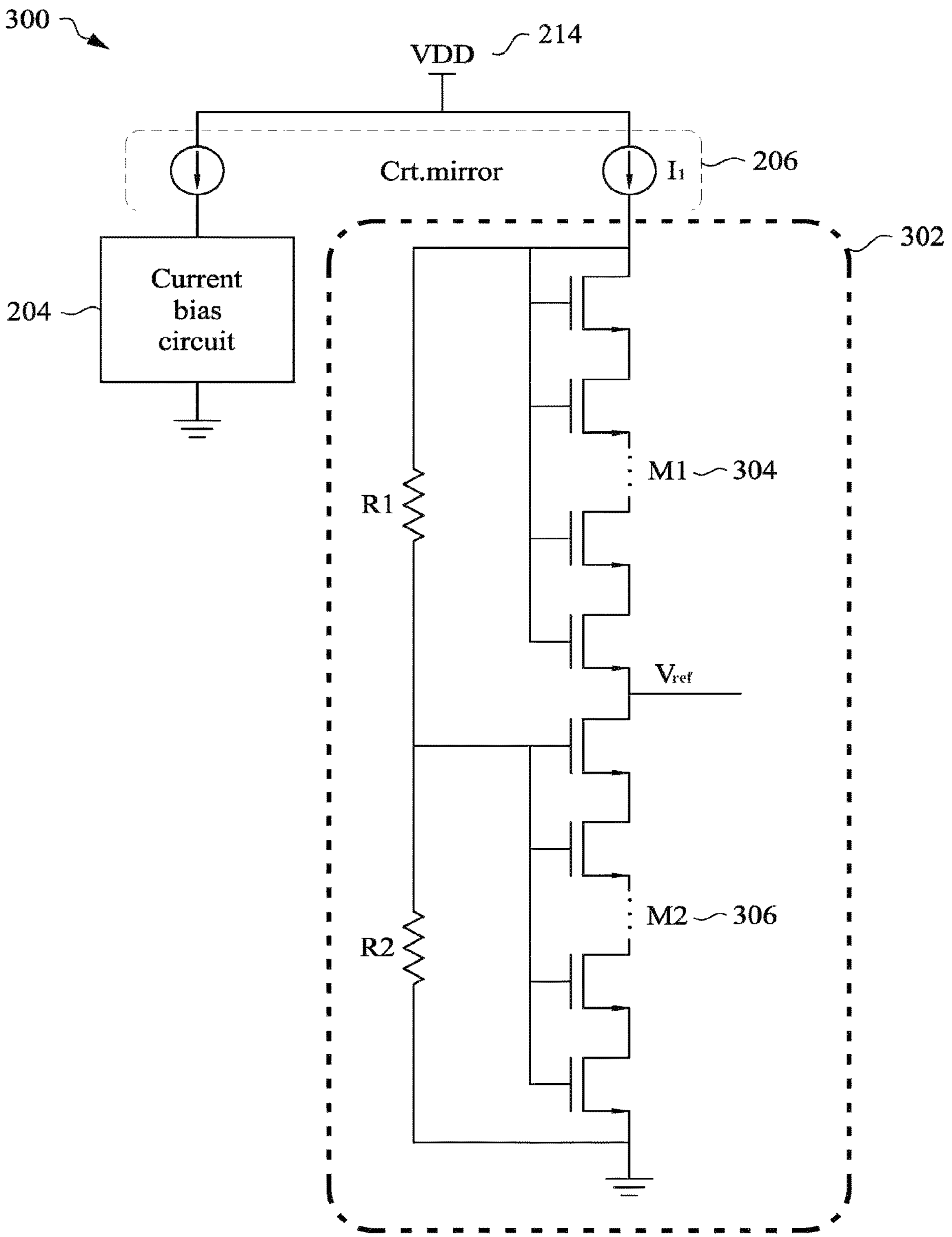
FIG. 3 is a diagram of a second example voltage reference circuit that includes a combined PTAT/CTAT temperature regulation circuit.

FIG. 3 is a diagram of a second example voltage reference circuit 300 that includes a combined PTAT/CTAT temperature regulation circuit 302. This voltage reference circuit 300 is the same as the example 200 shown in FIG. 2, except that in this embodiment M1 and M2 (304, 306) each include a series of MOSFETs. Specifically, M1 304 and M2 306 in the illustrated embodiment 300 each include a plurality of MOSFETs connected in a stacked gate arrangement, i.e., with the MOSFETs coupled in series by their source-drain terminals and the gate terminals of each MOSFET coupled together. The number and size of MOSFETs in each stack (M1 and M2) may, for example, be selected to improve accuracy of the temperature regulation circuit 302, while maintaining the ratio of M1 and M2 as N:1. It should be understood that increasing the number of transistors in a stack may increase the accuracy of the temperature regulation circuit 302, but at the possible cost of decreased TC performance. The inclusion of stacked transistors for M1 and M2 304, 306 may also enable the use of shorter channel length MOS devices.

Figure 4:
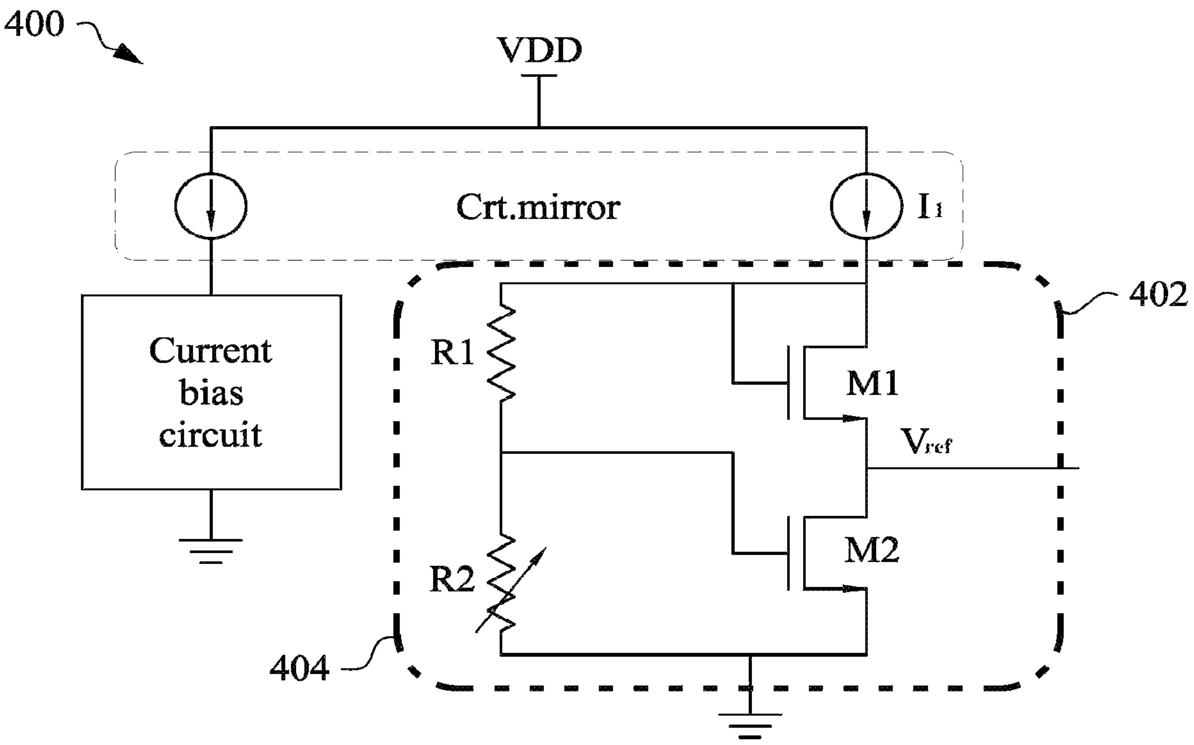
FIG. 4 is a diagram of a third example voltage reference circuit that includes a combined PTAT/CTAT temperature regulation circuit.

FIG. 4 is a diagram of a third example voltage reference circuit 400 that includes a combined PTAT/CTAT temperature regulation circuit 402. This voltage reference circuit 400 is the same as the example 200 shown in FIG. 2, except that in this embodiment the second resistor (R2) 404 is a variable resistor that is adjustable to tune the TC of the temperature regulation circuit 402. Increasing the value of R2 404 reduces the CTAT, making the TC of the temperature regulation circuit 402 more positive. Conversely, decreasing the value of R2 404 increases the CTAT, making the TC of the temperature regulation circuit 402 move negative. For the illustrated temperature regulation circuit 402, this is achieved by adjusting the value of R2 in the following operational equation:

$$Vref \sim \eta (kT/q) * \ln(N) + (R1/R2) * Vgs_{M2}$$

Figure 5:
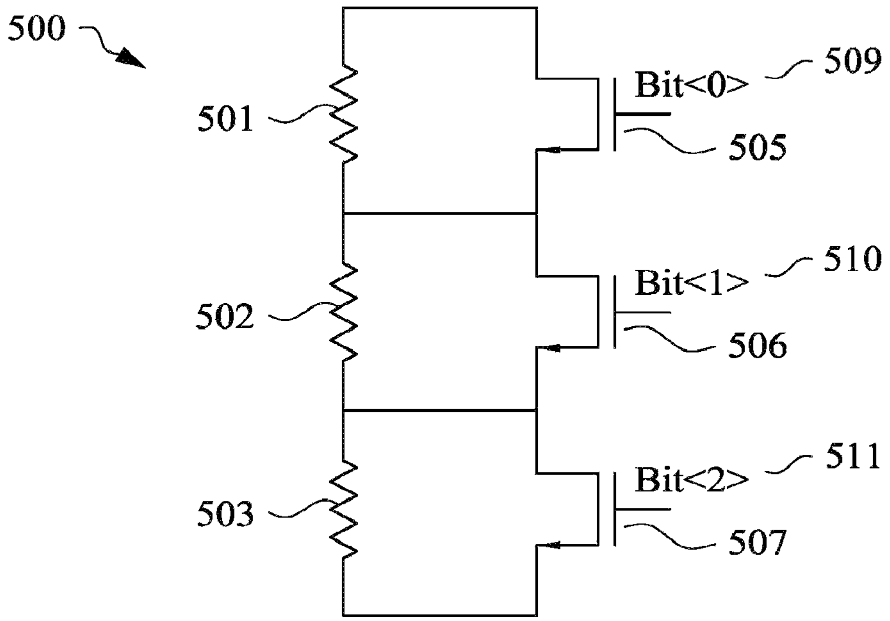
FIG. 5 is an example of a resistor trimming circuit that may be used for the variable resistor in FIG. 4.

FIG. 5 is an example of a resistor trimming circuit 500 that may be used for the adjustable resistor R2 404 in FIG.

4. The example resistor trimming circuit 500 includes a plurality of resistors 501-503 connected in series, and a plurality of selection transistors 505-507. The selection transistors 505-507 are connected in series by their source-drain terminals, and each selection transistor 505-507 is connected in parallel with a respective one of the plurality of resistors 501-503. The selection transistors 505-507 are controlled at their gate terminals by a series of resistor trimming bits (Bit<0>-Bit(<2>) 509-511, that operate to couple the resistors 501-503 into or out of the resistor network in order to adjust resistance of the resistor trimming circuit 500. For example, receiving a logic high signal on Bit<0>509 will cause selection transistor 505 to turn on, thus bypassing resistor 501 in the resistor network and reducing the overall resistance of the resistor trimming circuit 500. In this way, the value of the series of resistor trimming bits (Bit<0>-Bit(<2>) 509-511 may be selectable in order to provide an adjustable resistor, such as resistor R2 404 in FIG. 4.

Figure 6:
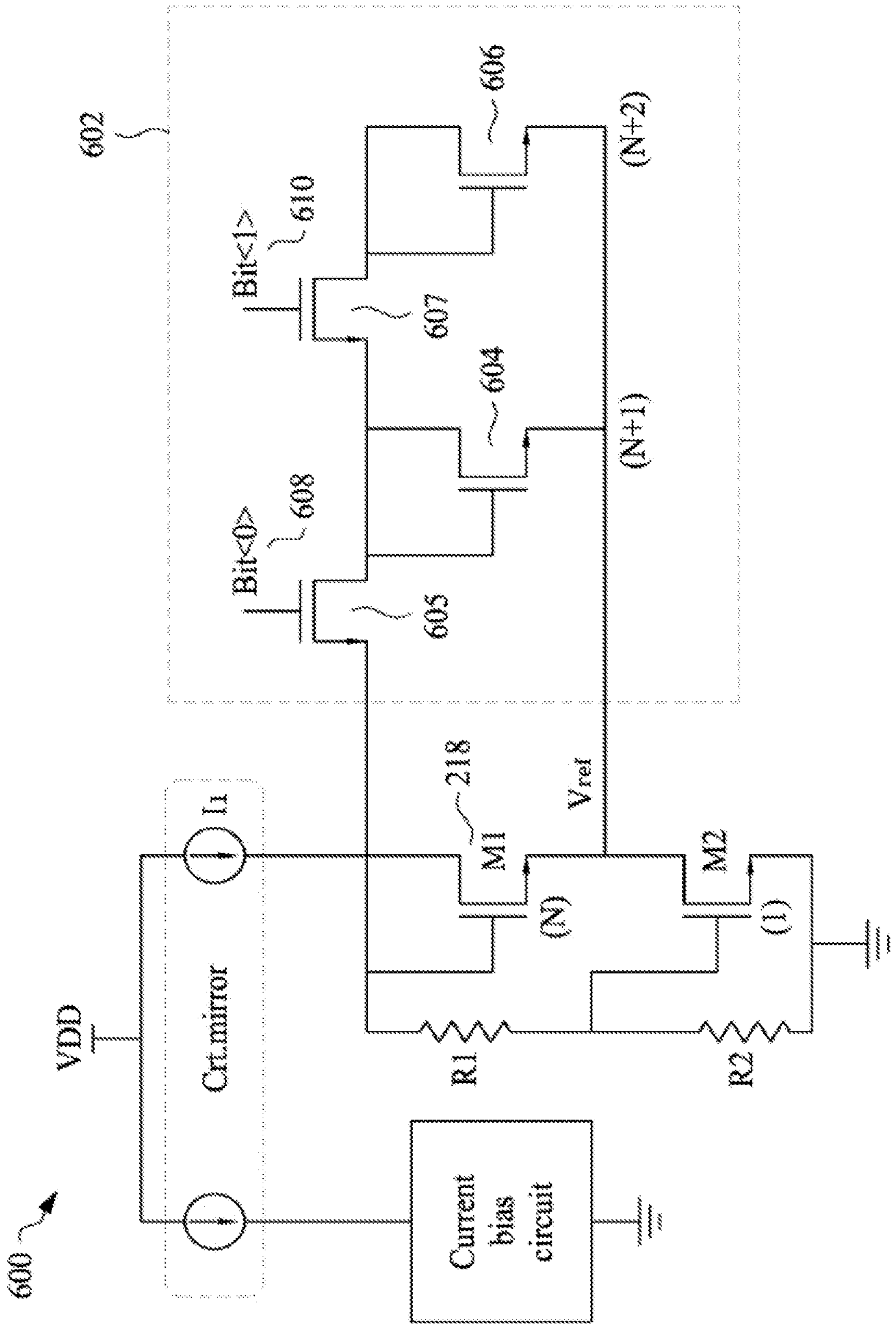
FIG. 6 is a diagram of a fourth example voltage reference circuit that includes a combined PTAT/CTAT temperature regulation circuit.

FIG. 6 is a diagram of a fourth example voltage reference circuit 600 that includes a combined PTAT/CTAT temperature regulation circuit. This voltage reference circuit 600 is the same as the example 200 shown in FIG. 2, except that in this embodiment the PTAB circuit may be tuned by adjusting the effect of the first transistor (M1) 218 using a MOS trimming circuit 602. The MOS trimming circuit 602 includes a plurality of trimming MOSFETS 604, 606 and a plurality of selection transistors 605, 607. The trimming MOSFETS 604, 606 are selectively coupled in parallel with the first transistor (M1) 218 using the plurality of selection transistors 605, 607 that are controlled using a series of control bits (Bit<0>, Bit<1>) 608, 610. The control bits (Bit<0>, Bit<1>) 608, 610 are each received at a gate terminal of one of the plurality of selection transistors 605, 607, and operate to couple the respective trimming MOSFETS 604, 606 into or out of a MOS trimming network. For example, receiving a logic high signal on Bit<1>610 will cause selection transistor 607 to turn on, coupling MOSFET 606 to the trimming network. In this way, the control bits (Bit<0>, Bit(<1>) 509-511 may be selectable in order to adjust the resolution of the PTAT circuit by adjusting the value of N in the following operational equation:

$$Vref \sim \eta(kT/q)*\ln(N)+(R1/R2)*VgS_{M2}$$

Figure 7:
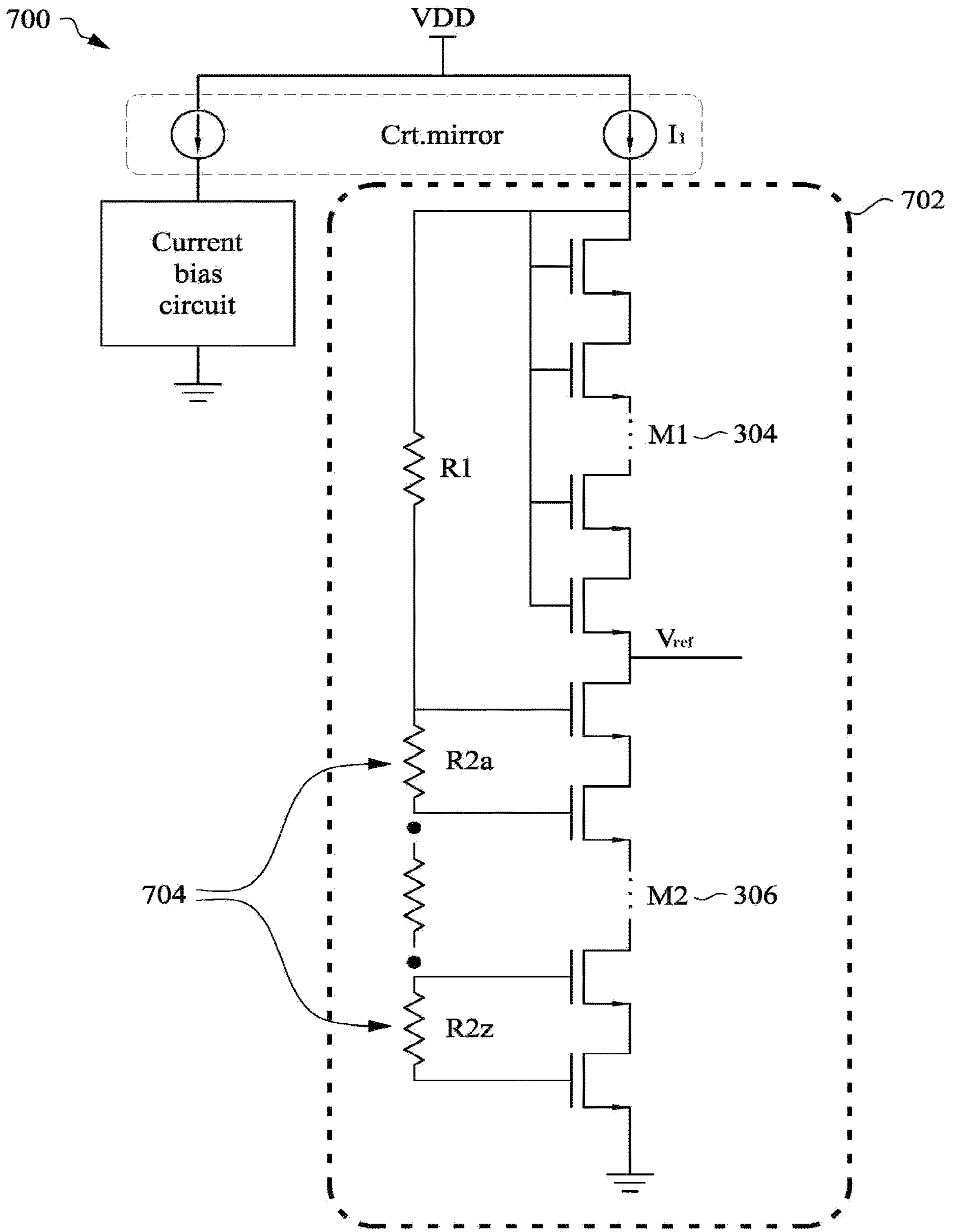
FIG. 7 is a diagram of a fifth example voltage reference circuit that includes a combined PTAT/CTAT temperature regulation circuit.

FIG. 7 is a diagram of a fifth example voltage reference circuit 700 that includes a combined PTAT/CTAT temperature regulation circuit 702. This voltage reference circuit 700 is the same as the example 300 shown in FIG. 3, except that in this embodiment the resistance R2 is split into a plurality of resistors (R2*a*-R2*z*) 704 coupled between the gate terminals of the transistors in the MOSFET stack 306 for M2 306. For example, in the illustrated embodiment, one of the plurality of resistors (R2*a*-R2*z*) 704 is coupled between the gate terminals of each adjacent pair of transistors in the MOSFET stack 306 for M2 306. The increased number of resistors for R2 in this embodiment provides an increased resolution for selecting the value of R2 in order to fine tune the TC of the temperature regulation circuit 702

Figure 9:
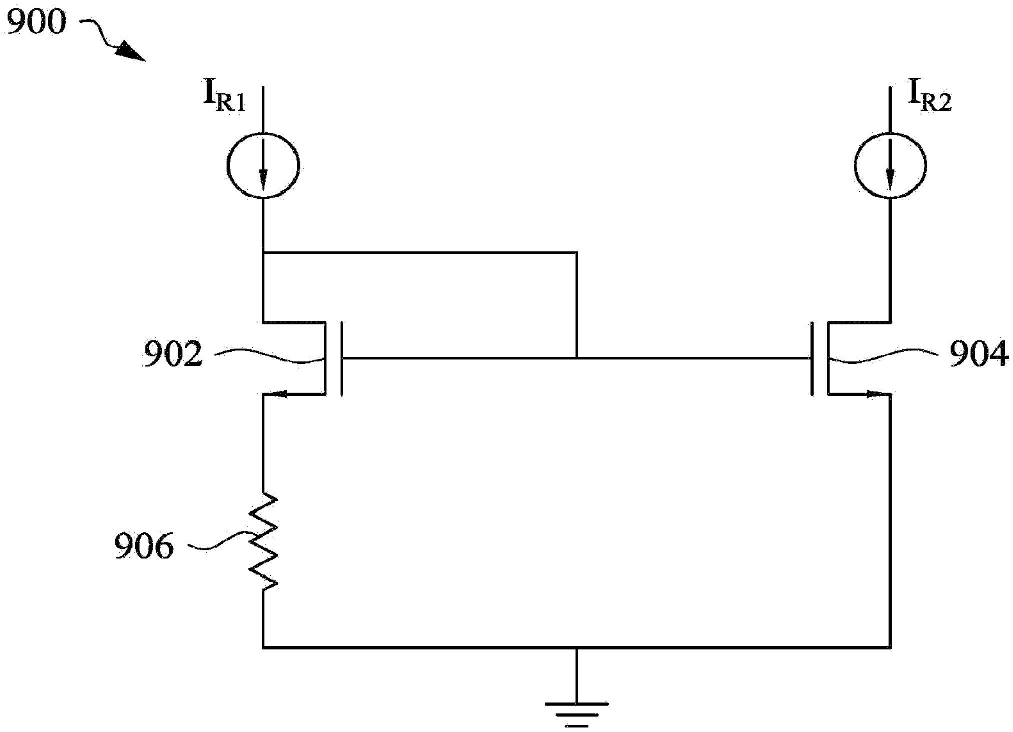

FIGS. 8 and 9 respectively illustrate examples of a current mirror circuit 800 and a current bias circuit 900 that may be used in the voltage reference circuits shown in FIGS. 2, 3, 4, 6, and 7. With reference first to FIG. 8, the example current mirror circuit 800 includes a first reference current MOSFET 802, a second reference current MOSFET 804, and an output current MOSFET 806. The first and second reference current MOSFETs 802, 804 are configured as a first current mirror that outputs a reference current ($I_{R1}$) and a mirrored reference current ($I_{R2}$) that are input to a differential current bias circuit, for example as shown in FIG. 9. The reference current MOSFETS 802, 804 are also connected in a current mirror configuration with output MOSFET 806, forming a second current mirror that mirrors the reference current ($I_{R1}$ and $I_{R2}$) as the output current ($I_1$).

The example current bias circuit 900 shown in FIG. 9 includes first and second biasing MOSFETs 902, 904 that form a differential amplifier pair and a biasing resistor 906 coupled between the source terminal of the first biasing MOSFET 902 and a ground potential. The transconductance ($g_m$) values of biasing MOSFETs 902, 904 may, for example, be closely matched to provide a substantially constant transconductor current bias. In this way, a substantially constant reference current ($I_{R1}$ and $I_{R2}$) may be maintained through the reference current branch of the current mirror.

It should be understood that other current mirror and/or current bias circuit configurations may also be used in the voltage reference circuits shown in FIGS. 2, 3, 4, 6, and 7. Preferably, other example current mirror configurations will include a low variation in low bias conditions and other example current bias configurations will include a substantially process, voltage, and temperature (PVT) invariant structure. For example, FIGS. 10 and 11 illustrate additional examples of current mirror circuits that may be utilized.

With reference first to FIG. 10, this figure illustrates an example of a stacked gate current mirror circuit 1000 which may, for example, be used with the current bias circuit 900 of FIG. 9. The example current mirror 1000 illustrated in FIG. 10 is similar to the example current mirror 800 shown in FIG. 8, except that in this example 1000 the MOSFET in each of the three current mirror branches is replaced with a series of MOSFETs 1002, 1004, 1006 connected in a stacked gate arrangement, i.e., with the MOSFETs coupled in series by their source-drain terminals and the gate terminals of each MOSFET coupled together. The number and size of MOSFETs in each stack 1002, 1004, 1006 may, for example, be selected to improve accuracy of the current mirror by minimizing any mismatch between the three current mirror branches.

FIG. 11 illustrates an example of a wide swing cascade current mirror 1100 which may, for example, be used with the current bias circuit 900 of FIG. 9. The example current mirror 1100 illustrated in FIG. 11 is similar to the example current mirror 800 shown in FIG. 8, except that in this example 1100 an additional MOSFET 1102, 1104, 1106 is coupled in series with the MOSFET 802, 804, 806 in each of the three current mirror branches. In addition, the gate terminals of the three additional MOSFETs 1102, 1104, 1106 are coupled to a bias voltage (Vb) 1108. In operation, the bias voltage 1108 may be selected to compensate for any voltage drop of VDD across the MOSFETs in the current mirror 1100 and current bias 900 circuits, thus providing an increased available signal swing compared, for example, to the current mirror 800 shown in FIG. 8.

Figure 12:
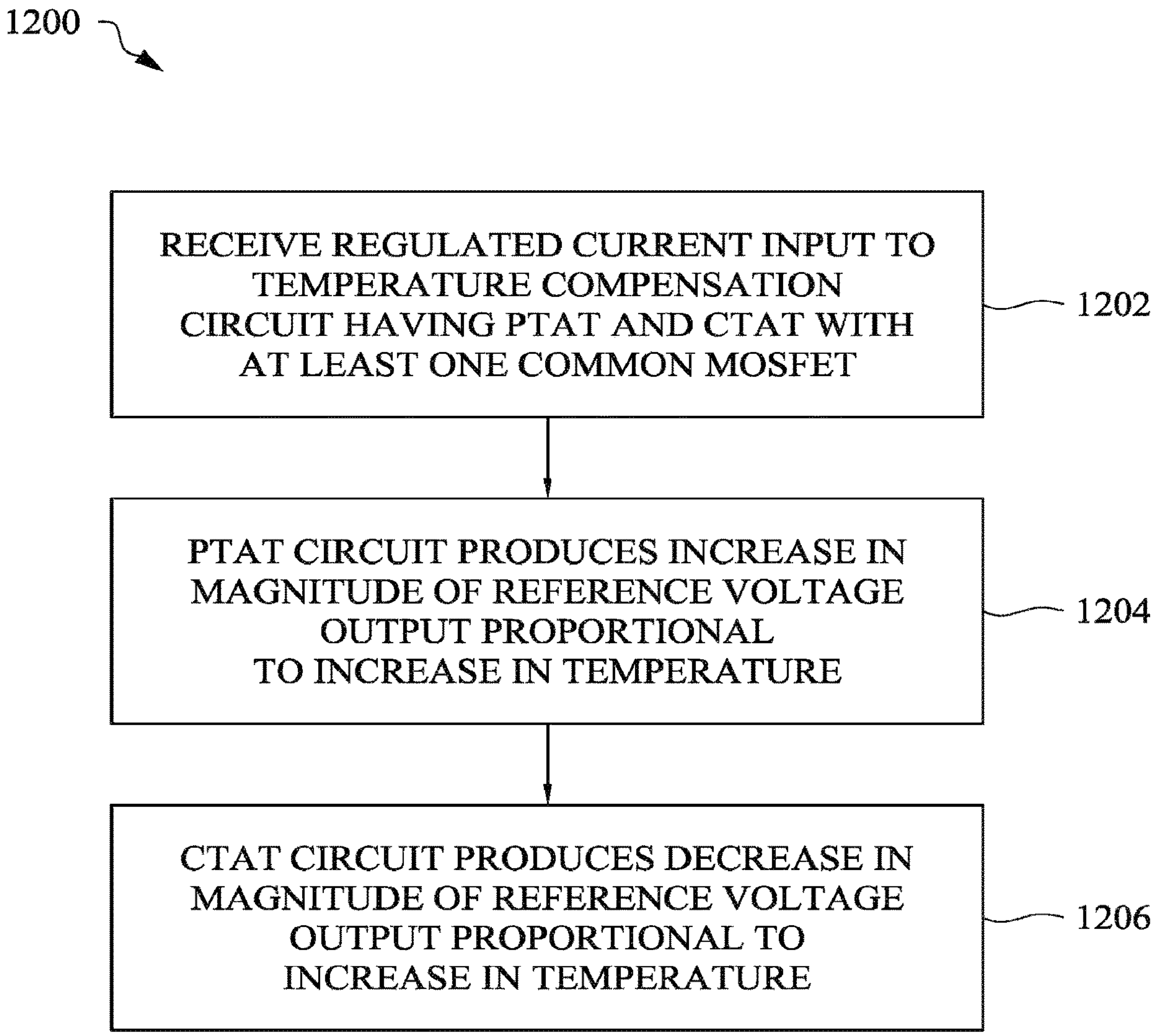
FIG. 12 is a flow diagram of an example method for generating a temperature compensated reference voltage.

FIG. 12 is a flow diagram of an example method 1200 for generating a temperature compensated reference voltage. At 1202, a regulated input current is received by a temperature compensation circuit that includes a proportional-to-absolute temperature (PTAT) circuit and a complementary-to-absolute temperature (CTAT) circuit with at least one common metal-oxide-semiconductor field-effect transistor (MOSFET). At 1204, the PTAT circuit produces an increase in magnitude of a reference voltage output of the temperature compensation circuit proportional to an increase in temperature. At 1206, the CTAT circuit produces a decrease in magnitude of the reference voltage output of the temperature compensation circuit proportional to the increase in temperature, such that the increase in magnitude of the reference voltage produced by the PTAT circuit is at least partially offset by the decrease in magnitude of the reference voltage produced by the CTAT circuit.

In one example, a temperature compensation circuit includes a proportional-to-absolute temperature (PTAT) circuit, and a complementary-to-absolute temperature (CTAT) circuit. The PTAT circuit and the CTAT circuit include at least one common metal-oxide-semiconductor field-effect transistor (MOSFET) and are configured to collectively generate a reference voltage in response to a regulated current input. The PTAT circuit is configured to produce an increase in magnitude of the reference voltage with an increase of temperature, and the CTAT circuit is configured to generated a decrease in magnitude of the reference voltage with the increase of temperature, wherein the increase in magnitude of the reference voltage produced by the PTAT circuit is at least partially offset by the decrease in magnitude of the reference voltage produced by the CTAT circuit.

In one example, a voltage reference circuit includes a temperature compensation circuit that receives a regulated current input at an input node and generates a reference voltage at an output node, the temperature compensation circuit comprising a proportional-to-absolute temperature (PTAT) circuit and a complementary-to-absolute temperature (CTAT) circuit that share at least one common metal-oxide-semiconductor field-effect transistor (MOSFET) and that collectively generate the reference voltage in response to the regulated current input. The PTAT circuit is configured to produce an increase in magnitude of the reference voltage with an increase of temperature, and the CTAT circuit configured to generated a decrease in magnitude of the reference voltage with the increase of temperature, wherein the increase in magnitude of the reference voltage produced by the PTAT circuit is at least partially offset by the decrease in magnitude of the reference voltage produced by the CTAT circuit. In embodiments, the voltage reference circuit may further include a current bias circuit that generates a reference current, and a current mirror circuit that generates the reference current input responsive to the reference current.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A circuit comprising:
- a proportional-to-absolute temperature (PTAT) circuit;
- a complementary-to-absolute temperature (CTAT) circuit, wherein the PTAT circuit and the CTAT circuit include a common transistor and are configured to generate a reference voltage in response to an input;
- an input node configured to receive the input; and
- a first resistor coupled between the common transistor and the input node.

2. The circuit of claim 1, wherein:
- the reference voltage is generated at an output node of the circuit;
- the PTAT circuit comprises a first transistor and a second transistor,
- a first source/drain terminal and a gate terminal of the first transistor are coupled to the input node;
- a second source/drain terminal of the first transistor is coupled to a first source/drain terminal of the second transistor and the output node; and
- a second source/drain terminal of the second transistor is coupled to a ground potential;
- the CTAT circuit comprises the second transistor, the first resistor, and a second resistor,
- the first resistor is coupled between the gate terminal of the first transistor and a gate terminal of the second transistor, and
- the second resistor is coupled between the gate terminal of the second transistor and the ground potential.

3. The circuit of claim 2, wherein the second resistor comprises a variable resistor and a resistance value of the variable resistor is adjustable to modify a temperature coefficient of the circuit.

4. The circuit of claim 3, wherein the variable resistor comprises a resistor trimming circuit that includes:
- a plurality of trimming resistors coupled in series to form a resistor network; and
- a plurality of selection transistors, each of which is coupled in parallel with a respective one of the plurality of trimming resistors and is controlled by a respective one of resistor trimming bits to adjust a resistance value of the resistor network.

5. The circuit of claim 1, wherein:
- the reference voltage is generated at an output node of the circuit;
- the PTAT circuit comprises a first series of transistors and a second series of transistors;
- the first series of transistors include a first plurality of transistors coupled in series;
- gate terminals of the first plurality of transistors are coupled together,
- the second series of transistors includes a second plurality of transistors that are coupled in series;
- gate terminals of the second plurality of transistors are coupled together,
- a first source/drain terminal and the gate terminals of the first series of transistors are coupled to the input node;
- a second source/drain terminal of the first series of transistors is coupled to a first source/drain terminal of the second series of transistors and the output node;
- a second source/drain terminal of the second series of transistors is coupled to a ground potential;
- the CTAT circuit comprises the second series of transistors, the first resistor, and a second resistor,
- the first resistor is coupled between the gate terminals of the first series of transistors and the gate terminals of the second series of transistors; and
- the second resistor is coupled between the gate terminals of the second series of transistors and the ground potential.

6. The circuit of claim 1, wherein:
- the reference voltage is generated at an output node of the circuit;
- the PTAT circuit comprises a first series of transistors and a second series of transistors;
- the first series of transistors includes a first plurality of transistors that are coupled in series;

gate terminals of the first plurality of transistors are coupled together;

the second series of transistors include a second plurality of transistors that are coupled in series;

a first source/drain terminal and the gate terminals of the first series of transistors are coupled to the input node;

a second source/drain terminal of the first series of transistors is coupled to a first source/drain terminal of the second series of transistors and the output node;

a second source/drain terminal of the second series of transistors is coupled to a ground potential;

the CTAT circuit comprises the second series of transistors, the first resistor, and a series of second resistors;

the first resistor is coupled between the gate terminals of the first series of transistors and a gate terminal of the second series of transistors;

the series of second resistors include a plurality of resistors that are coupled in series between the first resistor and the ground potential; and each of the plurality of resistors is coupled between gate terminals of a respective one of adjacent pairs of transistors of the second series of transistors.

7. The circuit of claim 1, wherein:

the reference voltage is generated at an output node of the circuit;

the PTAT circuit comprises a first transistor, a second transistor, and a trimming circuit;

a first source/drain terminal and a gate terminal of the first transistor are coupled to the input node;

a second source/drain terminal of the first transistor is coupled to a first source/drain terminal of the second transistor and the output node;

a second source/drain terminal of the second transistor is coupled to a ground potential;

the trimming circuit is coupled between the first and second source/drain terminals of the first transistor;

the trimming circuit is controllable by a series of control bits to couple one or more of a plurality of trimming transistors in parallel with the first transistor;

the CTAT circuit comprises the second transistor, the first resistor, and a second resistor;

the first resistor is coupled between the gate terminal of the first transistor and a gate terminal of the second transistor, and the second resistor is coupled between the gate terminal of the second transistor and the ground potential.

8. A circuit comprising:

a proportional-to-absolute temperature (PTAT) circuit and a complementary-to-absolute temperature (CTAT) circuit that share a transistor and that are configured to generate a reference voltage in response to an input at an input node; and a first resistor coupled between the transistor and the input node.

9. The circuit of claim 8, further comprising:

a current bias circuit configured to generate a reference current; and a current mirror circuit configured to generate a reference current input in response to the reference current.

10. The circuit of claim 8, wherein:

the reference voltage is generated at an output node of the circuit;

the PTAT circuit comprises a first transistor and a second transistor, a first source/drain terminal and a gate terminal of the first transistor is coupled to the input node;

a second source/drain terminal of the first transistor is coupled to a first source/drain terminal of the second transistor and the output node;

a second source/drain terminal of the second transistor is coupled to a ground potential;

the CTAT circuit comprises the second transistor, the first resistor, and a second resistor;

the first resistor is coupled between the gate terminal of the first transistor and a gate terminal of the second transistor, and the second resistor is coupled between the gate terminal of the second transistor and the ground potential.

11. The circuit of claim 10, wherein the second resistor comprises a variable resistor and a resistance value of the variable resistor is adjustable to modify a temperature coefficient of the circuit.

12. The circuit of claim 11, wherein the variable resistor comprises a trimming circuit that includes:

a plurality of trimming resistors coupled in series to form a resistor network; and a plurality of selection transistors, each of which is coupled in parallel with a respective one of the plurality of trimming resistors and is controlled by a respective one of resistor trimming bits to adjust a resistance value of the resistor network.

13. The circuit of claim 8, wherein:

the reference voltage is generated at an output node of the circuit;

the PTAT circuit comprises a first series of transistors and a second series of transistors;

the first series of transistors include a first plurality of transistors that are coupled in series;

gate terminals of the first plurality of transistors are coupled together;

the second series of transistors include a second plurality of transistors that are coupled in series;

gate terminals of the second plurality of transistors are coupled together, a first source/drain terminal and the gate terminals of the first series of transistors are coupled to the input node;

a second source/drain terminal of the first series of transistors is coupled to a first source/drain terminal of the second series of transistors and the output node;

a second source/drain terminal of the second series of transistors is coupled to a ground potential;

the CTAT circuit comprises the second series of transistors, the first resistor, and a second resistor;

the first resistor is coupled between the gate terminals of the first series of transistors and the gate terminals of the second series of transistors; and the second resistor is coupled between the gate terminals of the second series of transistors and the ground potential.

14. The circuit of claim 8, wherein:

the reference voltage is generated at an output node of the circuit;

the PTAT circuit comprises a first series of transistors and a second series of transistors;

the first series of transistors include a first plurality of transistors that are coupled in series;

gate terminals of the first plurality of transistors are coupled together;

the second series of transistors include a second plurality of transistors that are coupled in series;

a first source/drain terminal and the gate terminals of the first series of transistors are coupled to the input node;

a second source/drain terminal of the first series of transistors is coupled to a first source/drain terminal of the second series of transistors and the output node;
a second source/drain terminal of the second series of transistors is coupled to a ground potential;
the CTAT circuit comprises the second series of transistors, the first resistor, and a series of second resistors;
the first resistor is coupled between the gate terminals of the first series of transistors and a first gate terminal of the second series of transistors;
the series of second resistors include a plurality of resistors that are coupled in series between the first resistor and the ground potential; and
each of the plurality of resistors is coupled between gate terminals of a respective one of adjacent pairs of transistors of the second series of transistors.

15. The circuit of claim 8, wherein:
the reference voltage is generated at an output node of the circuit;
the PTAT circuit comprises a first transistor, a second transistor, and a trimming circuit;
a first source/drain terminal and a gate terminal of the first transistor are coupled to the input node;
a second source/drain terminal of the first transistor is coupled to a first source/drain terminal of the second transistor at the output node;
a second source/drain terminal of the second transistor is coupled to a ground potential;
the trimming circuit is coupled between the first and second source/drain terminals of the first transistor;
the trimming circuit is controllable by a series of control bits to couple one or more of a plurality of trimming transistors in parallel with the first transistor;
the CTAT circuit comprises the second transistor, the first resistor, and a second resistor;
the first resistor is coupled between the gate terminal of the first transistor and a gate terminal of the second transistor, and
the second resistor is coupled between the gate terminal of the second transistor and the ground potential.

16. A method comprising:
receiving an input at an input node of a circuit; and
generating a reference voltage in response to the input using the circuit, wherein the circuit further includes a proportional-to-absolute temperature (PTAT) circuit and a complementary-to-absolute temperature (CTAT) circuit, the PTAT circuit and the CTAT circuit include a common transistor, and the circuit further includes a first resistor coupled between the common transistor and the input node.

17. The method of claim 16, further comprising varying one or more resistance values of the CTAT circuit to adjust an amount by which the CTAT circuit produces a decrease in the reference voltage with an increase of temperature.

18. The method of claim 17, wherein the one or more resistance values are varied using a series of resistor trimming bits.

19. The method of claim 16, further comprising coupling one or more additional transistors to the PTAT circuit to adjust an amount by which the PTAT circuit produces an increase in the reference voltage with an increase of temperature.

20. The method of claim 19, wherein the one or more additional transistors are coupled to the PTAT circuit using a series of control bits.

* * * * *